US012348621B2

(12) United States Patent
Ornelas et al.

(10) Patent No.: US 12,348,621 B2
(45) Date of Patent: *Jul. 1, 2025

(54) SECRET SPLITTING AND METADATA STORAGE

(71) Applicant: tZERO IP, LLC, Salt Lake City, UT (US)

(72) Inventors: Michael D. Ornelas, Draper, UT (US); Jesse Empey, Saratoga Springs, UT (US); Brad Welker, Bountiful, UT (US)

(73) Assignee: tZERO IP, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/756,639

(22) Filed: Jun. 27, 2024

(65) Prior Publication Data
US 2024/0348430 A1    Oct. 17, 2024

Related U.S. Application Data

(63) Continuation of application No. 17/169,985, filed on Feb. 8, 2021, now Pat. No. 12,052,347.
(Continued)

(51) Int. Cl.
*H04L 29/06*    (2006.01)
*G06F 3/06*    (2006.01)
(Continued)

(52) U.S. Cl.
CPC ............ *H04L 9/085* (2013.01); *G06F 3/0604* (2013.01); *G06F 3/0659* (2013.01);
(Continued)

(58) Field of Classification Search
CPC ..... H04L 9/085; H04L 9/0643; H04L 9/0897; H04L 9/30; H04L 9/50; H04L 9/0894;
(Continued)

(56) References Cited

U.S. PATENT DOCUMENTS 6,311,171 B1    10/2001   Dent
7,003,667 B1    2/2006    Slick et al.
(Continued)

FOREIGN PATENT DOCUMENTS

EP    2693358 A1    2/2014
JP    2007334417 A    12/2007
(Continued)

OTHER PUBLICATIONS

Japanese Patent Office, "Notice of Allowance", dated Oct. 31, 2024 from JP Application No. 2022-551266, from Foreign Counterpart to U.S. Appl. No. 17/169,985, pp. 1 through 4, Published: JP.
(Continued)

*Primary Examiner* — Harunur Rashid
(74) *Attorney, Agent, or Firm* — Fogg & Powers LLC

(57) ABSTRACT

A computing device includes at least one processor configured to determine a retrieved secret share from each of at least two secret share storage devices or media that are retrieved from at least two of a plurality of shareholders. The at least one processor is also configured to determine whether each respective retrieved secret share is one of the plurality of secret shares that were generated based on whether the respective hash of the respective retrieved secret share matches any hash in the list of hashes of the plurality of secret shares within the metadata. The at least one processor is also configured to, in response to determining that each retrieved secret share is among the plurality of secret shares that were generated, attempt to reconstitute a secret using retrieved secret shares from the at least two secret share storage devices or media.

18 Claims, 7 Drawing Sheets

Related U.S. Application Data

(60) Provisional application No. 62/981,663, filed on Feb. 26, 2020.

(51) Int. Cl.

| | |
|---|---|
| *G06F 8/61* | (2018.01) |
| *H04L 9/06* | (2006.01) |
| *H04L 9/08* | (2006.01) |
| *H04L 9/30* | (2006.01) |
| *H04L 9/00* | (2022.01) |

(52) U.S. Cl.
CPC .............. *G06F 3/0679* (2013.01); *G06F 8/61* (2013.01); *H04L 9/0643* (2013.01); *H04L 9/0897* (2013.01); *H04L 9/30* (2013.01); *H04L 9/50* (2022.05)

(58) Field of Classification Search
CPC ... H04L 9/3239; G06F 3/0604; G06F 3/0659; G06F 3/0679; G06F 8/61; G06F 3/0623; G06F 3/067
See application file for complete search history.

(56) References Cited

U.S. PATENT DOCUMENTS

| | | | |
|---|---|---|---|
| 7,548,621 | B1 | 6/2009 | Smith et al. |
| 8,855,318 | B1 | 10/2014 | Patnala et al. |
| 9,323,603 | B2 | 4/2016 | Resch et al. |
| 9,667,416 | B1 | 5/2017 | Machani et al. |
| 9,673,975 | B1 | 6/2017 | Machani |
| 9,954,680 | B1 | 4/2018 | Machani et al. |
| 2002/0071566 | A1 | 6/2002 | Kurn |
| 2004/0039924 | A1 | 2/2004 | Baldwin et al. |
| 2004/0042620 | A1 | 3/2004 | Andrews et al. |
| 2005/0086471 | A1 | 4/2005 | Spencer |
| 2007/0160198 | A1* | 7/2007 | Orsini .................. H04L 9/3247 380/28 |
| 2007/0223706 | A1 | 9/2007 | Gantman et al. |
| 2008/0031460 | A1 | 2/2008 | Brookner et al. |
| 2009/0122981 | A1 | 5/2009 | Kaji |
| 2010/0020966 | A1 | 1/2010 | Hata et al. |
| 2012/0121088 | A1 | 5/2012 | Hata et al. |
| 2013/0219189 | A1 | 8/2013 | Simmons |
| 2014/0250303 | A1 | 9/2014 | Miller et al. |
| 2015/0326547 | A1 | 11/2015 | Carlson |
| 2016/0241405 | A1 | 8/2016 | Jeong et al. |
| 2017/0005797 | A1* | 1/2017 | Lanc ....................... H04L 63/20 |
| 2017/0142082 | A1 | 5/2017 | Qian |
| 2018/0234239 | A1* | 8/2018 | Hasegawa ............... G06F 21/60 |
| 2018/0276745 | A1 | 9/2018 | Paolini-Subramanya et al. |
| 2018/0375653 | A1* | 12/2018 | Setty ..................... H04L 9/3218 |
| 2019/0288834 | A1 | 9/2019 | Black et al. |
| 2019/0342084 | A1 | 11/2019 | Mehedy et al. |
| 2020/0119908 | A1 | 4/2020 | Christensen et al. |
| 2020/0119917 | A1 | 4/2020 | Christensen et al. |
| 2021/0266150 | A1 | 8/2021 | Ornelas et al. |

FOREIGN PATENT DOCUMENTS

| | | | |
|---|---|---|---|
| JP | 2019153842 | A | 9/2019 |
| KR | 20050104220 | A | 11/2005 |
| KR | 20140072188 | A | 6/2014 |
| WO | 2009109232 | A1 | 9/2009 |
| WO | 2019021105 | A1 | 1/2019 |

OTHER PUBLICATIONS

"Authenticated encryption", Dec. 7, 2017, pp. 1-8.
"Divide and Manage Secret Data Securely With Shamir's Secret Sharing", Nov. 11, 2017, pp. 1-5.
"Public-key signatures", Nov. 16, 2018, pp. 1-9.
"Sealed Boxes", Sep. 28, 2019, pp. 1-3.
"Shamir39 Mnemonic Code Splitter", Oct. 3, 2017, pp. 1-3.
"Shamir's Quest: Collect Any 3 Keys to Unlock the Secret!", The blog at the bottom of the sea, Apr. 30, 2016, pp. 1-9.
"Ssss(1)—Linux man page", at least as early as Jan. 11, 2021, pp. 1 through 2, https://linux.die.net/man/1/ssss.
Armstrong, "How Coinbase Builds Secure Infrastructure to Store Bitcoin in the Cloud", The Coinbase Engineering Blog, Oct. 21, 2017, pp. 1-8.
Canadian Intellectual Property Office, "Office Action", from CA Application No. 3,169,707, from Foreign Counterpart to U.S. Appl. No. 17/169,985, filed Dec. 5, 2023, pp. 1 through 4, Published: CA.
European Patent Office, "Extended European Search Report", from EP Application No. 21761224.1, from Foreign Counterpart to U.S. Appl. No. 17/169,985, filed Jan. 31, 2024, pp. 1 through 9, Published: EP.
Flecther-Hill, "Kimono—trustless secret sharing using time-locks on Ethereum", medium.com, May 30, 2018, pp. 1-8.
GitHub, "bitcoin/bips", at least as early as Jan. 11, 2021, pp. 1 through 6, https://github.com/bitcoin/bips/blob/master/bip-0039.mediawiki.
Gray, "How to split a private key to create a "shared secret" and secure your XRP in the event of death/theft/natural disaster/etc. using Shamir's Secret Sharing Scheme", XRP Chat, Jul. 5, 2017, pp. 1-14, Invision Community.
International Bureau, "International Preliminary Report on Patentability" from PCT Application No. PCT/US2019/022607, from Foreign Counterpart to U.S. Appl. No. 16/355,527, filed Sep. 24, 2020, pp. 1 through 11, Published: WO.
International Bureau, "International Preliminary Report on Patentability", from PCT Application No. PCT/US2021/017019, from Foreign Counterpart to U.S. Appl. No. 17/169,985, filed Sep. 8, 2022, pp. 1 through 7, Published in: WO.
International Searching Authority, "International Search Report and Written Opinion from PCT Application No. PCT/US2019/022607 mailed Jul. 2, 2019", from Foreign Counterpart to U.S. Appl. No. 16/355,527, pp. 1-14, Published: WO.
International Searching Authority, "International Search Report and Written Opinion from PCT Application No. PCT/US2019/055032", from Foreign Counterpart to U.S. Appl. No. 16/595,004, filed Jan. 22, 2020, pp. 1-10, Published: US.
International Searching Authority, "International Search Report and Written Opinion from PCT Application No. PCT/US2019/055034", from Foreign Counterpart to U.S. Appl. No. 16/595,020, filed Jan. 23, 2020, pp. 1-11, Published: WO.
International Searching Authority, "International Search Report and Written Opinion from PCT Application No. PCT/US2021/017019", from Foreign Counterpart to U.S. Appl. No. 17/169,985, filed Jun. 1, 2021, pp. 1 through 10, Published: WO.
Miller, "Simple Security with Shamir Secret Sharing", GridPlus, Aug. 16, 2017, pp. 1-7.
Olimid, "Secret Sharing-based Group Key Establishment", Faculty of Mathematics and Computer Science, 2013, pp. 1-116, University of Bucharest.
Poettering, "What is 'Secret Sharing?'", Shamir's Secret Sharing Scheme, Jan. 2, 2018, pp. 1-3, point-at-infinity.org/ssss/.
Poyiatzis, "Shamir's Secret Sharing—A numeric example walk-through", Sep. 22, 2018, pp. 1 through 10, Unsplash.
Raman et al., "Dynamic Distributed Storage for Scaling Blockchains", arXiv: 1711.07617v1, Nov. 21, 2017, available at https://arxiv.org/abs/1711.07617v1, pp. 1 through 19.
Raman et al., "Dynamic Distributed Storage for Scaling Blockchains", arXiv: 1711.07617v2, Jan. 7, 2018, available at https://arxiv.org/abs/1711.07617v2, pp. 1 through 19.
Satoshilabs, "Dev Corner: A Detailed Guide to Shamir Backup", at least as early as Dec. 3, 2019, pp. 1 through 9.
Stetsyuk, "Never store your secrets in one place again", PassGuardian, Oct. 26, 2017, pp. 1-4.
Team Nchain, "Keys to Secure the Digital Future: nChains's Inventions for Security of Bitcoin, Digital Assets & Digital Resources", nChain, Aug. 3, 2017, pp. 1-7.
U.S. Patent and Trademark Office, "Final Office Action", U.S. Appl. No. 17/169,985, filed Sep. 27, 2023, pp. 1 through 19, Published: US.

(56) References Cited

OTHER PUBLICATIONS

U.S. Patent and Trademark Office, "Notice of Allowance", U.S. Appl. No. 17/169,985, dated Mar. 13, 2024, pp. 1 through 25, Published: US.
U.S. Patent and Trademark Office, "Office Action", U.S. Appl. No. 17/169,985, Mar. 16, 2023, pp. 1 through 32, Published: US.
Wikipedia, "Secret Sharing", Feb. 19, 2018, pp. 1-8.
Wikipedia, "Message authentication code", Mar. 8, 2018, pp. 1-5, Wikipedia.
Wikipedia, "Shamir's Secret Sharing", Oct. 20, 2017, pp. 1-6.
Canadian Intellectual Property Office, "Office Action", dated Oct. 15, 2024 from CA Application No. 3,169,707, from Foreign Counterpart to U.S. Appl. No. 17/169,985, pp. 1 through 5, Published: CA.
Raman et al., "Dynamic Distributed Storage for Blockchains," 2018 IEEE International Symposium on Information Theory (ISIT), Jun. 22, 2018, pp. 2619 through 2623.

* cited by examiner

SECRET SPLITTING AND METADATA STORAGE

CROSS-REFERENCE TO RELATED APPLICATIONS

This application is a continuation of U.S. patent application Ser. No. 17/169,985 filed on Feb. 8, 2021, entitled SECRET SPLITTING AND METADATA STORAGE, which claims the benefit of U.S. Provisional Patent Application Ser. No. 62/981,663 filed on Feb. 26, 2020, entitled "SECRET SPLITTING AND METADATA STORAGE", all of which is incorporated herein by reference.

BACKGROUND

Cryptography can be used to securely store and transmit data. Keys can be used to encrypt and decrypt data or to sign transactions.

SUMMARY

A computing device includes at least one processor and at least one memory communicatively coupled to the at least one processor. The at least one processor is configured to determine a secret to be protected. The at least one processor is also configured to split the secret into a plurality of secret shares, at least a subset of which are required to reconstitute the secret. The at least one processor is also configured to transfer each secret share to a respective portable storage device or media for distribution to a respective shareholder. The at least one processor is also configured to generate metadata with at least a hash of each secret share, wherein the metadata is stored separate from the portable storage devices or media with the secret shares.

A computing device includes at least one processor and at least one memory communicatively coupled to the at least one processor. The at least one processor is configured to determine a retrieved secret share from each of at least two secret share storage devices or media that are retrieved from the shareholders. The at least one processor is also configured to determine metadata, the metadata having at least a list of hashes of a plurality of secret shares that were generated before the secret shares were distributed to a plurality of shareholders. The at least one processor is also configured to attempt to reconstitute the secret using the retrieved secret shares from the at least two secret share storage devices or media. The at least one processor is also configured to, when the secret cannot be reconstituted from the retrieved secret shares, identify at least one of the retrieved secret shares as being incorrect based on the metadata.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
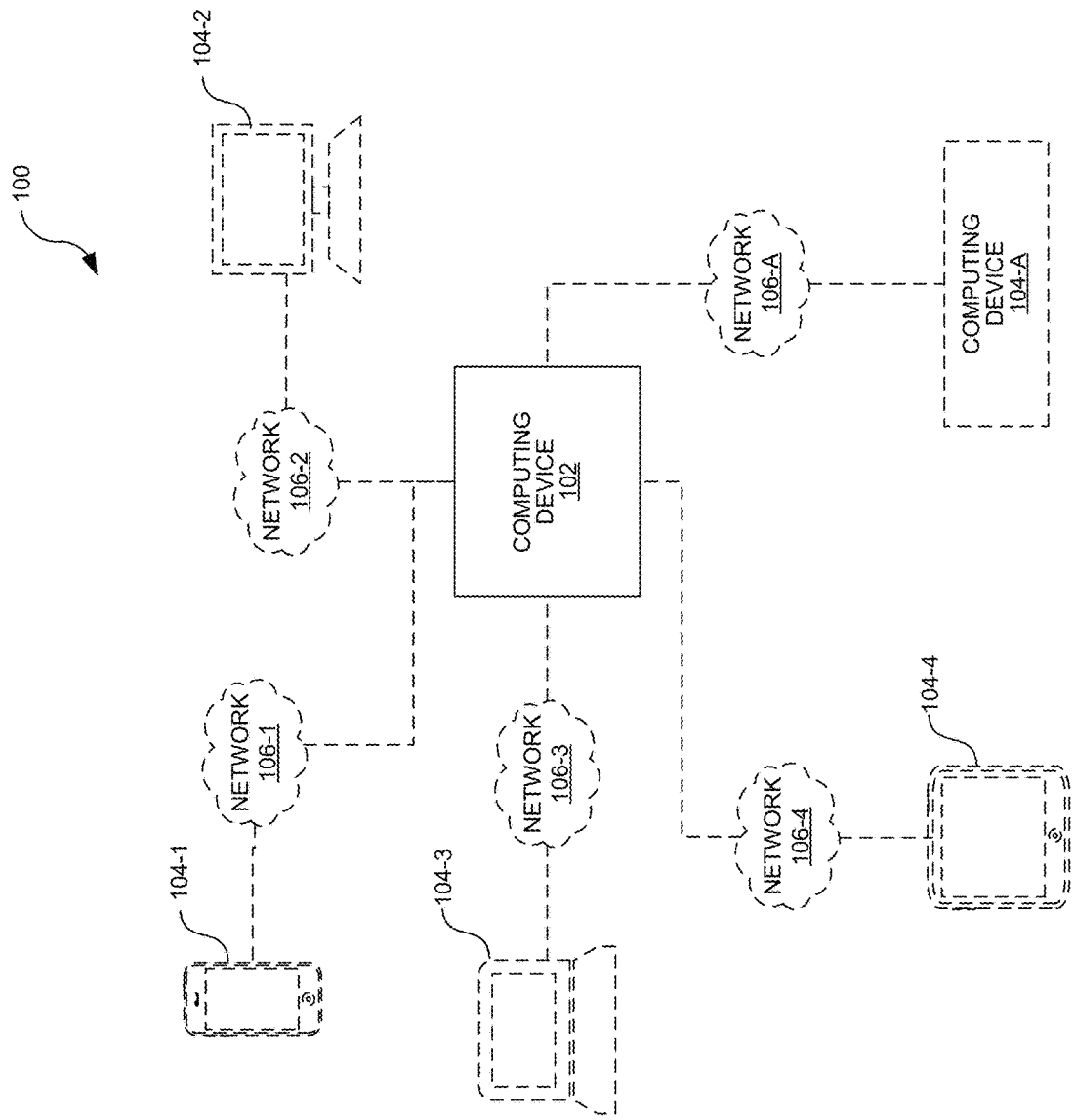
FIG. 1 is block diagram illustrating an example system for secret splitting and metadata storage.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Strings of characters can be used to encrypt and decrypt data, as well as to sign cryptographic transactions, e.g., cryptocurrency transactions. It is desirable to keep certain strings secure with only a limited number of people having access to them. These strings are referred to as "secrets" herein. One type of secret is a cryptographic key, including (but not limited to) a private key, a public key, an encryption key, a decryption key, a signing key, as well as a password, a secret phrase, an account number, or a mnemonic phrase or seed that can be used to reconstitute a key. For example, a secret may be a private key (or a mnemonic or seed derived from a private key) for an address in a distributed ledger that holds pooled cryptocurrency. Such a secret may have high value and care should be taken to secure it. Furthermore, a secret can be any digital data that can be represented as a string of characters, e.g., raw data of a digital picture arranged as a string, raw data of a digital video file arranged as a string, raw data of a digital audio file arranged as a string, or any other type of digital file arranged as a string of characters.

As used herein, the term "distributed ledger" refers to an electronic ledger that is distributed across multiple interconnected nodes, where more than one of the nodes stores a copy of the ledger. In some examples, the distributed ledger may implement one or more blockchains to validate the data stored within the distributed ledger. A blockchain is a verifiable permanent ledger constructed one block at a time with a proof-of-work seal (such as a hash) affixed to each block that validates that block. In a blockchain, the hash of the previous block is included in the current block, and therefore by recursion the current hash also validates all previous blocks back to the original genesis block. Inserting a hash into a blockchain permanently records that hash and acts as a notary verifying the time stamped proof-of-existence of the hashed data at the moment in time that block is added to the chain. Any future blocks add a layer of protection from manipulation of the data stored in the chain or a chain re-organization and therefore provide additional certainty that no changes can be made to blocks earlier in the chain. A blockchain is an implementation of a distributed ledger. Exemplary blockchains include, but are not limited to, the Bitcoin blockchain, the Ethereum blockchain, the Ravencoin blockchain, BigchainDB, Billon, Chain, Corda, Credits, Elements, Monax, Fabric, HydraChain, Hyperledger, Multichain, Openchain, Quorum, Sawtooth, and Stellar.

In symmetric encryption and decryption the same key can be used to encrypt and decrypt, e.g., to encrypt and decrypt one or more private keys for different blockchain addresses, accounts, and/or wallets. For example, an Advanced Encryption Standard (AES) key may be used to symmetrically encrypt and/or decrypt data. In some configurations, a secret may be an AES key (or a mnemonic or seed derived from an AES key). Without limitation, symmetric keys may operate according to any of the following encryption: Twofish, Serpent, Advanced Encryption Standard (AES), Blowfish, CAST5, Kuznyechik, RC4, Data Encryption Standard (DES), Triple DES (3DES), Skipjack, Safer+/++ (Bluetooth), IDEA and/or other cypher block coding (CBC) variations.

In some configurations, a secret may be an asymmetric key (or a mnemonic or seed derived from an asymmetric key). A "public/private keypair," which includes a private key and a corresponding public key, may be used in asymmetric encryption. The private key and public key may alternatively be referred to as an decrypting private key and an encrypting public key, respectively. The public key can be used to encrypt data, which can only be decrypted using the private key corresponding to the public key that was used for encryption. In examples, a public key may be used to generate a transaction address in a distributed ledger, and only the corresponding private key can sign a transaction that spends funds from the transaction address. This may be referred to as "asymmetric" encryption/decryption because the same key is not used to encrypt and decrypt (or sign transactions). In some configurations, the private key and public key may alternatively be referred to as a signing key and a signature verification key, respectively. It is generally desirable to keep a private key (and sometimes the public key) secure. Without limitation, asymmetric keys may operate according to any of the following encryption: Rivest-Shamir-Adleman (RSA) and Elliptic Curve Cryptography (ECC) (e.g., Curve25519), Edwards-curve Digital Signature Algorithm (EdDSA) (e.g., Ed25519), etc.

There is often a tradeoff between keeping keys secure and accessible when needed. In some instances, it is not desirable to have access to a secret limited to a single person. Further, it can also be desirable that more than one person be required to use a secret. In examples, this could be useful in cases where multiple directors, officers, partners, and/or employees of an organization are required to participate when a key is used. Secrets can be split into multiple shares where a subset of the shares can be used to reconstitute the secret. In examples, a secret is split into the set of secret shares using Shamir secret sharing and/or polynomial interpolation. The terms "part," "share," and "component" (and their variants) are used interchangeably herein to refer to one of multiple portions of a secret (such as a cryptographic key) that has been split. In examples, a particular quantity of the secret shares can be required to reconstitute a particular secret. For example, a particular secret may be split up into N secret shares, such that M of the N secret shares are required to reconstitute the particular secret. In examples, the N secret shares can be distributed to various shareholders. In examples, each secret share is distributed to a different person or group of people (shareholder) that doesn't overlap with another person or group of people that receives a different secret share. However, more than one secret share might be provided to the same person or group of people in some configurations.

In examples, the secret shares can be stored on portable storage devices or media for distribution to shareholders, e.g., USB keys/memory sticks (or other solid state drives), or optical or magnetic disks. In examples, the secret shares can be displayed on a screen and written down or otherwise physically distributed through printing (such as into a Quick Response (QR) code, barcode, etc.). In examples, shares of the secret (e.g., a key) can be electronically distributed to the devices of the users using at least one of email, Short Message Service (SMS), Multimedia Messaging Service (MMS), instant messaging, push notification (such as a push verify notification), by polling (or pulling) a notification, or by Bluetooth, Wi-Fi, or near field communication (NFC) transmission.

Splitting a secret and distributing to different people (or groups of people) adds a layer of security because it means that collusion among the different shareholders is required to maliciously reconstitute the key and encryption key. If and when the secret needs to be reconstituted, at least M of the N secret shares would need to be gathered. If reconstitution is unsuccessful, because the secret shares won't reconstitute to the correct secret or an error occurs during the reconstitution, it may be difficult to identify the point of failure. In other words, it can be difficult to know which secret share caused the failure. In the worst-case scenario, the secret may become unrecoverable if too many secret shares are lost, stolen or corrupted.

Accordingly, the present systems and methods improve systems requiring multiple shareholders to hold shares of a secret, where a number of the shares are required in order to perform an action. Specifically, the present systems and methods generate metadata that can be used to troubleshoot the source of a problem, if any, during reconstitution of the secret. This metadata can map (1) the distribution means (e.g., evidence bag) for a particular secret share to the particular secret share; and/or (2) the distribution means (e.g., evidence bag) for a particular secret share to a particular secret/wallet number.

The present systems and methods may improve conventional systems for secret distribution and storage in other ways. First, in addition to numbering the distribution means (e.g., evidence bag) for a particular secret share to the particular secret share, the metadata includes a hash of the secret share. Thus, in some configurations, the hash(es) of retrieved secret shares can be verified before an attempt is made to reconstitute the secret. For example, a person or script tasked with reconstituting the secret may (e.g., before attempting to reconstitute the secret) compare: (1) a hash generated from a secret share before the secret share is distributed to a shareholder; with (2) a hash generated from a retrieved secret share shortly before or after the secret share is used for secret reconstitution. This will ensure that only correct secret shares (secret shares that are what the shareholders claim they are) are used to reconstitute the secret.

Second, using an M of N system (where N>M>1 in some examples) as described herein would eliminate single points of failure. Specifically, in order for the key to become unrecoverable, M shares would need to be lost or stolen (or M of the shareholders would have to collude) before the secret could be reconstituted in an unauthorized way. A single lost/stolen secret share (or a single shareholder with malicious intent) could not reconstitute the secret.

Third, metadata used in the systems and methods described herein provide benefits (as described above) while mitigating any risk resulting from the loss or theft of the metadata. Even if one or more copies of the metadata were lost or stolen, an unauthorized holder would only how many outstanding secret shares exist (and the hash of those secret shares) but would not possess any of the actual secret shares.

As used herein, the term "encrypting" or its variants, refers to converting data into a code to prevent unauthorized access. Encryption can be implemented in various ways, such as with symmetric encryption using a single encryption key to both encrypt and decrypt data or with asymmetric encryption using a public key to encrypt data and a corresponding private key to decrypt data.

As used herein, the term "signing," or its variants, refers to adding or modifying data associated with a desired transaction, e.g., using a secret.

As used herein, unless otherwise specified, the term "user" refers to a person (or automated instructions, e.g., a script) that accesses the customer device 102 to initiate any of the functionality described herein.

As used herein, the term "wallet" refers to a set of instructions, digital file, and/or memory used to store and/or manage digital assets, such as cryptocurrency. Although the description herein mentions cryptocurrency in some places, other types of digital assets may be held and managed in a wallet. In some examples, a wallet may be defined by one or more private keys, one or more public keys derived from one or more private keys, and/or one or more transaction addresses derived from one or more private keys and/or one or more public keys. In some examples, a wallet may be defined by one or more private account keys (and optional corresponding public account key(s)), each of which may have one or more child and/or grandchild transaction keys.

FIG. 1 is block diagram illustrating an example system 100 for secret splitting and metadata storage. The system 100 includes a computing device 102 and a plurality of optional computing devices 104 (such as optional computing devices 104-1 through optional computing devices 104-A). Each of computing device 102 and computing devices 104 can be implemented as any of a mobile computing device, such as a mobile phone, tablet computer, mobile media device, mobile gaming device, laptop computer, vehicle-based computer, etc.; or a non-mobile device such as a dedicated terminal, a public terminal, a kiosk, a server, or a desktop computer. Each computing device 104 is communicatively coupled to the computing device 102 using at least one network 106 (such as network 106-1 through network 106-A). In examples, the at least one network 106 includes at least one wired network and/or at least one wireless network. In examples, any combination of wired and wireless networks is used to couple the computing devices 104 to the computing device 102. In examples, the at least one network 106 includes at least one of at least one local area network (LAN), at least one wide area network (WAN), or the Internet. In examples, any combination of local area networks, wide area networks, or the Internet is used as the at least one network 106 to couple the computing devices 104 to the computing device 102. In some configurations, the computing device 102 may be coupled to one or more other computing devices 104 sometimes, while being "air-gapped" (not connected to any wireless or wired networks) during other times. In examples, each of computing device 102 and computing devices 104 includes at least one memory, at least one processor, at least one optional network interface, at least one optional display device, at least one optional input device, and at least one power source.

Figure 2:
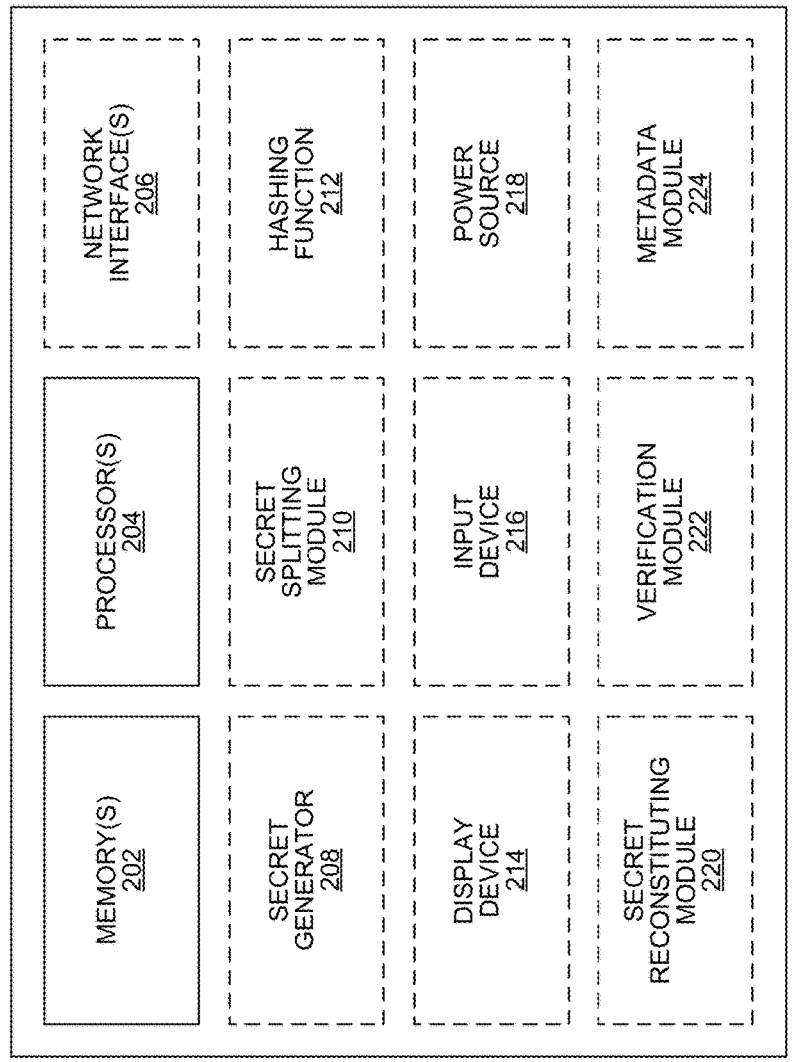
FIG. 2 is a block diagram illustrating an example computing device used in a system for secret splitting and metadata storage.

FIG. 2 is a block diagram illustrating an example computing device 102 used in a system 100 for secret splitting and metadata storage. The computing device 102 includes at least one memory 202, at least one processor 204, optional at least one network interface 206, optional secret generator 208, optional Shamir secret sharing module 210, optional hashing function 212, optional display device 214, optional input device 216, optional power source 218, optional secret reconstituting module 220, optional verification module 222, and optional metadata module 224.

In examples, the at least one memory 202 can be any device, mechanism, or populated data structure used for storing information. In examples, the at least one memory 202 can be or include any type of volatile memory, non-volatile memory, and/or dynamic memory. For example, the at least one memory 202 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs, M-DISCs) and/or the like. In accordance with some embodiments, the at least one memory 202 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as the at least one memory 202. The at least one memory 202 may be used to store instructions for running one or more applications or modules on the at least one processor 204. For example, the at least one memory 202 could be used in one or more examples to house all or some of the instructions needed to execute the functionality of the optional secret generator 208, optional Shamir secret sharing module 210, optional hashing function 212, optional secret reconstituting module 220, optional verification module 222, and/or optional metadata module 224.

The at least one processor 204 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the optional secret generator 208, optional Shamir secret sharing module 210, optional hashing function 212, optional secret reconstituting module 220, optional verification module 222, and/or optional metadata module 224 are implemented by the at least one processor 204 and the at least one memory 202.

In examples, the at least one optional network interface 206 includes or is coupled to at least one optional antenna for communication with a network (such as one of the at least one network 106 of system 100). In examples, the at least one optional network interface 206 includes at least one of an Ethernet interface, a cellular radio access technology (RAT) radio, a Wi-Fi radio, a Bluetooth radio, or a near field communication (NFC) radio. In examples, the at least one optional network interface 206 includes a cellular radio access technology radio configured to establish a cellular data connection (mobile internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 206 and/or the at least one optional network interface 206 includes a Wi-Fi (IEEE 802.11) radio configured to communicate with a wireless local area network that communicates with the remote server, rather than a wide area network. In examples, the at least one optional network interface 206 and/or the at least one optional network interface 206 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device. In examples, the same at least one optional network interface 206 and/or the at least one optional network interface 206 is also used for communication with an external gateway device to a network (such as an NFC payment terminal).

In examples, the optional at least one display device 214 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 216 include at least one of a touchscreen (including capacitive and resistive touchscreens), a touchpad, a capacitive button, a mechanical button, a switch, a dial, a keyboard, a mouse, a camera, a biometric sensor/scanner, etc. In examples, the optional at least one display device 214 and the optional at least one input device 216 are combined into a human machine interface (HMI) for user interaction with the computing device 102. In examples, at least one optional power source 218 is used to provide power to the various components of the network node 102.

The at least one processor 204 of the computing device 102 is configured to securely generate at least one secret. In examples, this is implemented in the optional secret generator 208. The at least one processor 204 of the computing device 102 may be configured to securely generate the at least one secret.

Figure 3:
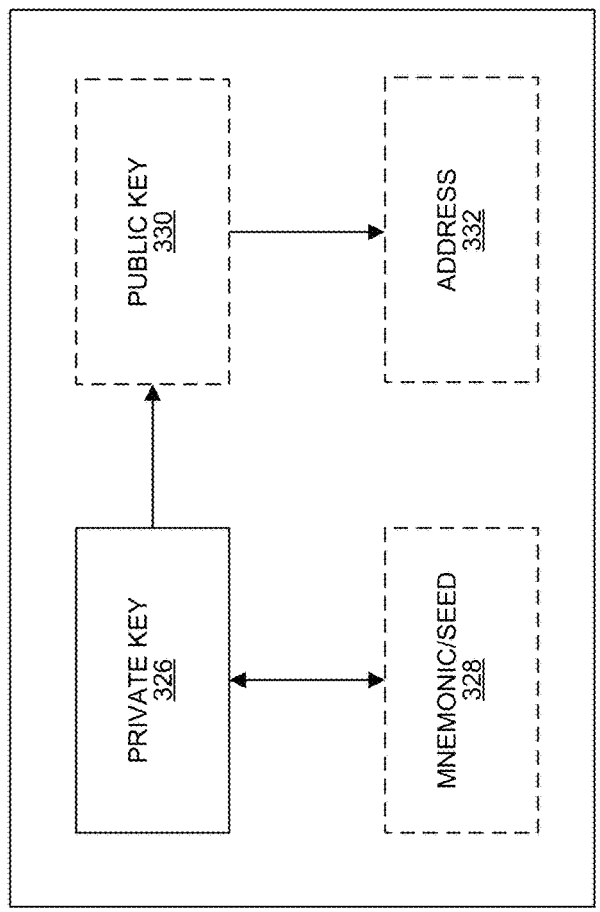
FIG. 3 is a block diagram illustrating an example secret generator.

FIG. 3 is a block diagram illustrating an example secret generator 208. In examples, the secret generator 208 generates different data at or near the same time. In examples, the secret generator 208 generates (1) a private key 326; (2) an optional mnemonic/seed 328 derived from the private key 326; (3) an optional public key 330; and/or (4) at least one optional address 332 in a distributed ledger (e.g., that holds cryptocurrency). In examples, each of the private key 326, the optional mnemonic/seed 328, the optional public key 330, and the at least one optional address 332 are represented as a different string of characters.

The private key 326 or the mnemonic/seed 328 may be the secret (that is later split and distributed to shareholders). In examples, the optional public key 330 corresponds to and is derived from the private key 326. In examples, the private key 326 and public key 330 (and optionally the address) are generated using a single function. The private key 326, however, would generally not be derivable from the public key 330. In examples, the private key 326 may be used to spend funds out of the optional address 332, while the optional public key 330 can be used to monitor transactions in and out of the address 332 or send cryptocurrency to the address 332. In examples, the private/public keypair is generated, and a hash of the public key 330 is the address on a distributed ledger (that can be used to transact into a wallet). Alternatively, the public key 330 is used to encrypt data, while the private key 326 may be used to decrypt data. The private key 326 would generally be kept secure (with relatively few people having access to it), while the public key(s) 330 would be shared more freely (with a greater number of people having access to it).

A mnemonic code or seed 328 may be used to recover the private key 326 if it is lost. In examples, the mnemonic code or seed 328 is a set of words (e.g., 12 or 15 words) from which the private key 326 can be derived. In examples, the mnemonic code or seed 328 is initially derived from the private key 326. In examples, the address 332 may be a hash of the public key 330. Accordingly, the address would be derived from the public key 330, but the public key 330 may not be derivable from the address 332.

Optionally, the at least one processor 204 of the computing device 102 is configured to generate the private key 326 by generating a sequence having random or pseudo-random characteristics. Optionally, the private key 326 may be generated according to Bitcoin Improvement Proposal 39 (BIP39) (available at https://github.com/bitcoin/bips/blob/master/bip-0039.mediawiki and incorporated by reference herein). In examples, the corresponding public key 330 is generated from the private key 326 by using elliptical curve multiplication (a type of cryptographic function). Then, as mentioned above, the address 332 may be a hash of the public key 330.

Returning again to FIG. 2, the at least one processor 204 is further configured to split the secret into a set of secret shares where at least one subset of the secret shares can be used to reconstitute the secret. In examples, this is implemented in the Shamir secret sharing module 210. In examples, the splitting is configurable, such that a particular quantity of secret shares may be required to reconstitute the secret. For example, a particular secret may be split into N secret shares, such that M of the N secret shares are required to reconstitute the particular secret. In examples, each secret share is distributed to a different shareholder. In examples, the secret shares can optionally be verified (described in more detail below) before being distributed to various shareholders. In examples, the secret is split into the N secret shares through at least one of Shamir secret sharing and polynomial interpolation. Optionally, the secret shares can be encrypted (e.g., with a symmetrical key or an asymmetrical key) before distribution to the shareholders. As used herein, a "shareholder" is an individual or organization that is entrusted to securely store at least one secret share. In other words, the secret shares are distributed to shareholders, following secret generation and splitting, for safekeeping.

In examples, each secret share can be transferred to a separate storage device or media. In examples, each secret share is burned onto an archival-grade optical disc, e.g., a MILLENNIAL DISC (M-DISC) that will retain data for hundreds or even 1,000 years. Optionally, each separate secret share is also placed into a security envelope or package that is tamper-resistant (making tampering with the contents difficult) and/or tamper-evident (providing a mechanism that indicates whether the contents of the security envelope or package have been tampered with or not).

Whether a security envelope or package is used or not, each secret share is distributed to a respective shareholder once placed on a respective storage media. Generally, each secret share would be given to a different shareholder, however, configurations are possible where a single shareholder would receive more than one of the generated secret shares.

Alternatively or additionally, the secret shares may be electronically distributed to devices belonging to the shareholders (or group of shareholders) using the at least one network interface 206, such as by at least one of email, Short Message Service (SMS), Multimedia Messaging Service (MMS), instant messaging, push notification, or push verify notification. In examples, the secret shares can be displayed, printed, or otherwise fixed on a medium (e.g., as a quick response (QR) code) provided to shareholders who could then input the secret share into their corresponding computing device 104, transcribe in their own handwriting, and/or securely store the printout itself.

The at least one processor 204 of the computing device 102 is further configured to generate a hash of the secret and/or individual secret shares. In examples, this is implemented in a cryptographic hashing function 212. In examples, a hash of a secret or secret share may be generated before the secret shares are distributed, then saved for verification purposes. In examples, a hashing function 212 takes an input (a string of characters, such as a secret or a secret share) and returns a hash (a different string of characters). The input to a hashing function 212 is uniquely deterministic of the output (the hash). In other words, a particular hashing function 212 will only produce a hash of a particular value from one particular input, and any change to the input will produce a hash of a different value. Comparing hashes of secret shares can serve as a proxy for verifying the secret shares themselves, as described below. Examples of hashing functions 212 that could be used include, without limitation: Secure Hashing Algorithm (SHA)-1, any of the SHA-2 functions (e.g., SHA-256 or SHA-512 (sometimes referred to as SHA2-512)), or MD4, MD5, RIPEMD160, etc.

In examples, the at least one processor 204 of the computing device 102 is further configured to reconstitute the secret from a set of secret shares where at least one subset of the secret shares can be used to reconstitute the secret, e.g., M of N secret shares are required to reconstitute the secret. In examples, this is implemented in the secret reconstituting module 220. In examples, the at least one processor 204 is configured to retrieve a subset (e.g., M of N) secret shares from a subset of the shareholders. In examples, if the secret shares were distributed on portable storage devices or media (e.g., optical discs), the retrieval includes reading the subset of secret shares from the portable storage device(s) or media physically brought to a computing device 102. Alternatively, if the secret shares were distributed on printouts (e.g., barcodes or QR codes), the retrieval includes scanning the subset of secret shares (physically brought by the shareholders) using an imaging device, such as a camera, scanner, etc. Alternatively, if the secret shares were distributed electronically via at least one network 106, the retrieval can include receiving the subset of secret shares from the shareholders' electronic devices 104 via the at least one network 106.

Once the subset of secret shares is retrieved (e.g., to an air-gapped computing device 102), a secret reconstituting module 220 is configured to securely reconstitute the secret. In examples, the Shamir secret sharing (e.g., performed by the Shamir secret sharing module 210) includes defining a polynomial of M−1 degree using the secret 434-1, where each of the N secret shares 436-1 is a point on the defined polynomial. In these examples, the secret 434-2 is reconstituted (e.g., in the secret reconstituting module 220) by determining the original polynomial from at least M of the N retrieved secret shares 436-2.

If, however, the secret shares were encrypted before distribution, they may be decrypted before the secret is reconstituted. In examples where a secret share is encrypted with a symmetric key before distribution, the same symmetric key may be used to decrypt the secret share before it is used to reconstitute the secret. Alternatively, where a secret share is encrypted with a respective asymmetric key (e.g., a public key) before distribution, a decryption key that corresponds to the respective asymmetric key (e.g., a private key corresponding to the public key) may be used to decrypt the secret share before it is used to reconstitute the secret. When secret shares are not encrypted before distribution to the shareholders, they would not need to be decrypted before secret reconstitution.

In examples, the at least one processor 204 of the computing device 102 is further configured to verify (1) at least one secret share; and/or (2) the reconstituted secret itself. In examples, this is implemented in a verification module 222. In examples, the at least one processor 204 is configured to compare hashes taken at two different times. In examples, the at least one processor 204 can compare (1) a hash generated from a secret share before the secret share is distributed to a shareholder; with (2) a hash generated from the distributed secret share shortly before or after the secret share is used for secret reconstitution. If the two hashes match, the secret shares (from which the hashes were generated) are verified as being the same, e.g., the secret share retrieved from the shareholder is the same as the secret share originally given to the shareholder.

Alternatively or additionally, the at least one processor 204 can compare (1) a hash generated from a secret before the secret is split; with (2) a hash generated from the secret following reconstitution. If the two hashes match, the secrets from which the hashes were generated, are verified as being the same, e.g., the reconstituted secret is the same as the original secret. It should be noted that the various verification discussed herein is optional.

In examples, the at least one processor 204 of the computing device 102 is further configured to collect and store metadata about the secret and/or secret shares generated at the computing device 102. In examples, this is implemented in a metadata module 224. Among other things, the metadata can be used to verify secret shares before and/or after secret reconstitution. Furthermore, the metadata can be used to identify which of the secret shares, retrieved from the shareholders, was the cause of failure in the event of an error during secret reconstitution (or the incorrect secret was reconstituted using the retrieved secret shares).

In examples, the metadata includes: (1) a list of the hashes of the secret shares; (2) an address that was generated with (and corresponding to) the secret; (3) a mapping of the distribution means (e.g., evidence bag identifier) for each secret share to a particular secret/wallet number; (4) a copy of the hashing function 212 code (e.g., a set of instructions executable to hash the secret shares); and/or (5) a copy of the code used to split the secret (e.g., a set of instructions executable to perform Shamir splitting). In examples, each copy of the metadata is saved on a separate portable storage device or media, e.g., an M-DISC. Alternatively or additionally, the metadata can be stored in password manager software, printed out as a QR code for safekeeping, electronically transmitted to cloud-based storage, etc.

Figure 4:
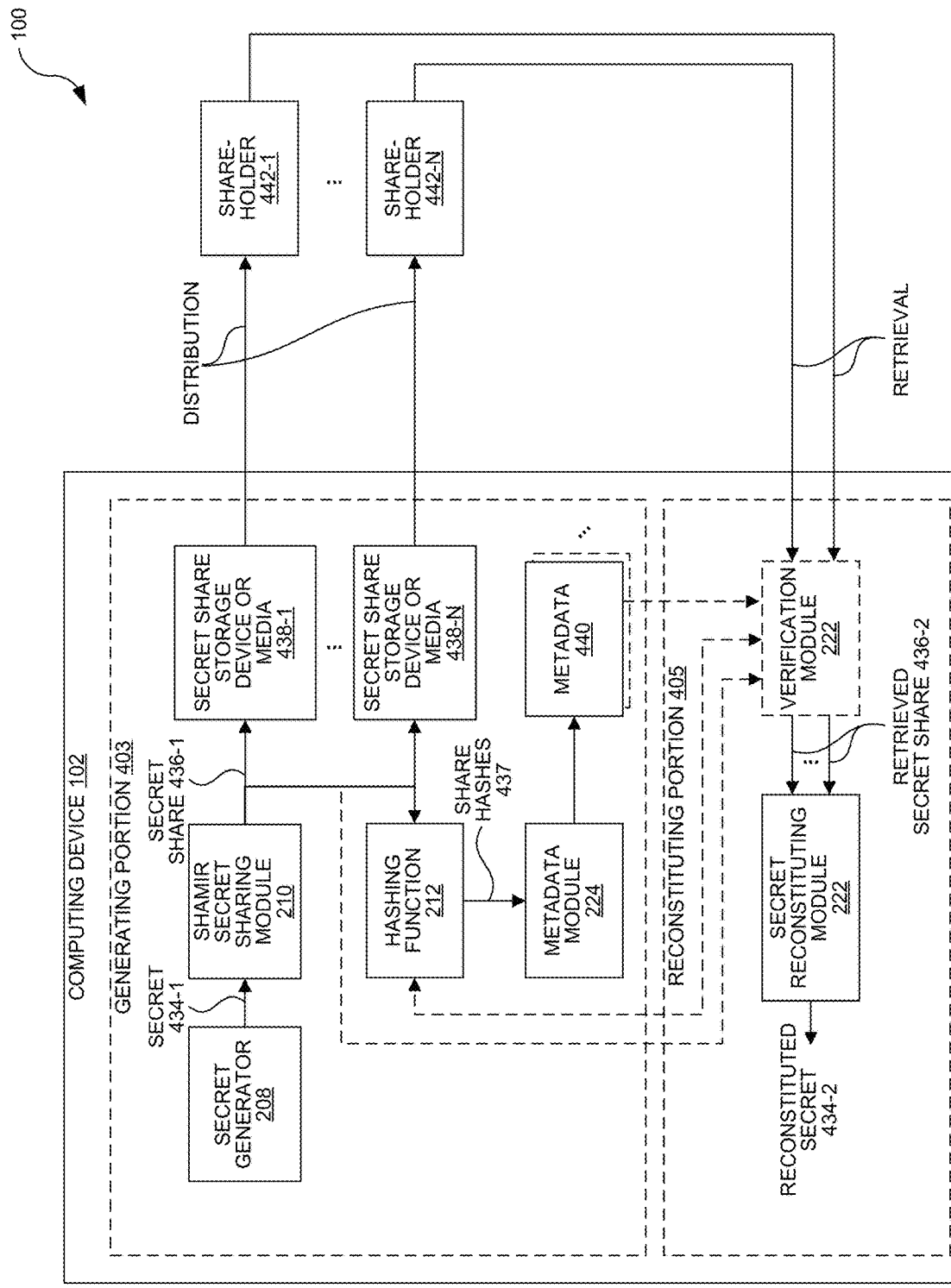
FIG. 4 is a block diagram illustrating an example system for secret splitting and metadata storage.

FIG. 4 is a block diagram illustrating an example system 100 for secret 434-1 splitting and metadata 440 storage. Specifically, FIG. 4 illustrates various stages: (1) a secret 434-1 being generated and split into secret shares 436-1; (2) metadata 440 being generated; (3) the secret shares 436-1 being distributed to shareholders 442-1 through 442-N; (4) the secret shares 436-2 being retrieved; and (5) the secret 434-2 being reconstituted from the retrieved secret shares 436-2. In some configurations, some of the 5 stages can be performed while the computing device 102 is coupled to other computing devices 104 (e.g., via at least one network 106), while other of the 5 stages can be performed while the computing device 102 is air-gapped (not coupled to any wired or wireless networks). In examples, stages (1) is performed while the computing device 102 is air-gapped, while at least some of stages (2)-(5) are performed while the computing device 102 is coupled to at least one other computing device 104.

With reference to secret shares 436-2 or a portable storage device or media, the term "retrieved" is used to indicate that something has been distributed to a shareholder 442 and brought back to a computing device 102. In examples, a retrieved secret share 436-2 may or may or may not be one of the original secret shares 436-1 that were generated before distribution, depending on whether the portable storage device or media storing the retrieved secret share 436-2 has been tampered with (or the shareholder 442 mistakenly brought in the wrong portable storage device or media).

For the sake of simplicity, a single computing device 102 is illustrated in FIG. 4, however, the computing device 102 that generates the secret shares 436-1 to be distributed may or may not be the same computing device 102 as the one that reconstitutes the secret 434-2. In other words, the generating portion 403 and the reconstituting portion 405 may be in the same or different computing devices 102.

Optionally, the computing device 102 may be securely erased/formatted before the secret 434-1 is generated and split. This may include using any suitable technique for erasing/formatting a storage device (e.g., hard disc drive). In examples, this includes encrypting the contents of a storage device (e.g., hard disc drive) in the computing device 102, and restoring an operating system (e.g., from a cloud-based server). A decryption key may be generated or derived during the encryption process.

The secret 434-1 can be any string of characters, such as a cryptographic private key 326 (e.g., for an address 332 in a distributed ledger that holds pooled cryptocurrency), a password, a mnemonic phrase or seed 328 that can be used to reconstitute a private key 326, a public key 330, an address 332, a secret phrase, an account number, raw data of a digital picture arranged as a string, raw data of a digital video file arranged as a string, raw data of a digital audio file arranged as a string, or any other type of digital file arranged as a string of characters.

In examples, a secret generator 208 generates the secret 434-1. In examples where the secret 434-1 is a private key 326 or a mnemonic/seed 328 for recovering the private key 326, the secret generator 208 may also generate an optional public key 330 and/or at least one optional address 332 (that holds cryptocurrency) in a distributed ledger. In examples where the secret 434-1 is a private key 326, the secret generator 208 generates the private key 326 by generating a sequence having pseudo-random characteristics. When at least one optional address 332 is generated with the secret 434-1, it may optionally be verified by (1) sending a small amount of cryptocurrency to the address 332; and (2) verifying the small amount by viewing transactions for the address 332 in the distributed ledger itself. Alternatively, the secret 434-1 may be identified and/or received (e.g., via user input or from memory) at the computing device 102 rather than being generated on the computing device 102. For example, an existing account number, password, or other string of characters may be input or sent to the computing device 102 rather than being generated on the computing device 102.

In examples, a Shamir secret sharing module 210 splits the secret 434-1 into at least two secret shares 436-1. In examples, the secret 434-1 is split into N secret shares 436-1 where M of the N secret shares 436-2 are required to reconstitute the secret 434-2. In examples, the secret 434-1 is split into the secret shares 436-1 using Shamir secret sharing and/or polynomial interpolation. In examples, input (e.g., user input) is received at the Shamir secret sharing module 210 to specify the M and N values for the splitting. Generally, and without limitation, 1<M<=N.

In examples, a hashing function 212 (e.g., SHA-512) generates a share hash 437 of each secret share 436-1. Each secret share 436-1 is deterministic of exactly one hash value for a given modern hashing function 212, such as SHA-512. The share hashes 437 may be saved in at least one copy of metadata 440 (e.g., stored on an archival-grade optical media, such as an M-DISC) by a metadata module 224. In addition to a list of the share hashes 437, each copy of the metadata 440 may also include: (1) a list of address(es) 332 that were generated with (and corresponding to) the secret 434-1; (2) a mapping of the distribution means (e.g., evidence bag identifier) for each secret share 436-1 to a particular secret 434-1/wallet number; (3) a copy of the hashing function 212 code (e.g., a set of instructions executable to hash the secret shares 436-1); and/or (4) a copy of the code used to split the secret 434-1 (e.g., a set of instructions executable to perform Shamir splitting). In examples, the metadata 440 can be stored in password manager software, printed out as a QR code for safekeeping, or electronically transmitted to cloud-based storage instead of (or in addition to) transferring them to optical disc(s).

In examples, the share hashes 437 are saved in the metadata 440 for later verifying the retrieved secret shares 436-2 at or near the time when a secret 434-2 being reconstituted.

Optionally, the secret shares 436-1 can be verified by a verification module 222 before distribution. In examples, every secret share 436-1 is used to reconstitute the secret 434-2 at least once. For example, the secret 434-2 would need to be reconstituted at least N/M (rounded up to an integer) times, e.g., if M=3 and N=5, the secret 434-2 would need to be reconstituted 5/3 (rounded up to an integer)=2 times so that every secret share 436-1 is used at least once during secret 434-2 reconstitution.

In examples, the secret 434-1 is compared against the reconstituted secret(s) 434-2. When the secret 434-1 matches the reconstituted secret(s) 434-2, the secret shares 436-1 (used to reconstitute the secret(s) 434-2) are verified and can be distributed to the shareholders 442. When the secret 434-1 does not match the reconstituted secret(s) 434-2, the secret shares 436-1 (used to reconstitute the secret(s) 434-2) are not verified and are not distributed to the shareholders 442 until the cause of the problem is identified and corrected.

Alternatively, a hash of the secret 434-1 can be compared against hash(es) of the reconstituted secret(s) 434-2. When hash of the secret 434-1 matches the hash(es) of the reconstituted secret(s) 434-2, the secret shares 436-1 (used to reconstitute the secret(s) 434-2) are verified and can be distributed to the shareholders 442. When the hash of the secret 434-1 does not match the hash(es) of the reconstituted secret(s) 434-2, the secret shares 436-1 (used to reconstitute the secret(s) 434-2) are not verified and are not distributed to the shareholders 442 until the cause of the problem is identified and corrected.

Optionally, the secret 434-1, the share hashes 436-1, and/or the reconstituted secrets 434-2 are deleted from the computing device 102 once the secret shares 436-1 are verified (by reconstituting the secret 434-2 using every secret share 436-1 at least once).

Once the secret 434-1 is split into secret shares 436-1 (and the secret shares 436-1 are optionally verified), each secret share 436-1 may be transferred onto a respective secret share storage device or media 438-1 through 438-N. In examples, the secret share storage devices or media 438 are archival-grade optical media, e.g., M-DISCs. However, other types of portable storage devices or media may be used instead of or in addition to optical media. Alternatively, the secret shares 436-1 could be distributed on physical printouts (e.g., barcodes or QR codes), distributed electronically via at least one network 106, electronically displayed so that the shareholder 442 can transcribe it in their own handwriting, etc. Optionally, the secret shares 436-1 may be encrypted before being transferred on the secret share storage devices or media 438. Optionally, the secret shares 436-1 are deleted from the computing device 102 after they are transferred onto portable storage devices or media for distribution.

Optionally, the computing device 102 may be securely erased/formatted again following distribution of the secret shares 436-1. This may include using any suitable technique for erasing/formatting a storage device (e.g., hard disc drive). In examples where the storage device (e.g., hard disc drive) of the computing device 102 was encrypted before secret 434-1 generation, the corresponding decryption key (generated or derived when the storage device was encrypted) can be destroyed, e.g., securely deleted.

When the secret 434-2 is to be reconstituted, at least some of the secret share storage devices or media 438 (storing the secret shares 436-2) are retrieved from the shareholders 442. The number of secret share storage devices or media 438 retrieved depends on the values of M and N that were determined during secret 434-1 splitting. When M<N, the number of retrieved secret share storage devices or media 438 is less than the number of distributed secret shares 436-1. When M=N, all of the distributed secret share storage devices or media 438 are retrieved for secret 434-2 reconstitution.

When the secret share storage devices or media 438 were physically distributed (e.g., on secret share storage devices or media 438 or physical printouts), at least a subset would generally be physically brought back to the computing device 102. In this case, at least a subset of the shareholders 442 may be asked to physically bring their respective secret share storage device or media 438 to a meeting at an appointed date and time. When the secret share storage devices or media 438 are physically retrieved, they may need to be processed before verification and/or secret reconstitution, e.g., by reading the secret shares 436-2 on the secret share storage devices or media 438, by scanning a QR code on a printout, etc.

When the secret shares 436-1 were electronically distributed (e.g., via at least one network 106), at least a subset would generally be electronically retrieved (e.g., via at least one network 106) from the shareholders 442. This may include an electronic request being sent to the devices of at least a subset of the shareholders 442, which are then approved causing the secret shares to be transmitted to the computing device 102. In some configurations, the computing device 102 generating and splitting the secret 434-1 for distribution may be different than the computing device 102 that reconstitutes the secret 434-2.

When the secret shares 436-1 were encrypted before distribution, they will be decrypted after retrieval before they can be verified or the secret 434-2 reconstituted. When a secret share 436-1 is symmetrically encrypted before distribution, it is symmetrically decrypted following retrieval. When a secret share 436-1 is asymmetrically encrypted before distribution, it is asymmetrically decrypted following retrieval. When secret shares 436-1 are not encrypted before distribution to the shareholders 442, they would not need to be decrypted before secret 434-2 reconstitution.

Before reconstituting the secret 434-2, the retrieved secret shares 436-2 may optionally be verified. In examples, a hash of at least one of the retrieved secret shares 436-2 (that is generated at or near the time of secret 434-2 reconstitution) is compared against the list of share hashes 437 (in the metadata 440 generated before the secret shares 436-1 were distributed). When a hash of a retrieved secret share 436-2 matches a hash in the list of share hashes 437 (in the metadata 440), it means the retrieved secret share 436-2 can be used to reconstitute the desired secret 434-2 (because it matches the secret shares 436-1 that was originally distributed to a shareholder 442-1). When a hash of a retrieved secret share 436-2 does not match any hash in the list of share hashes 437 (in the metadata 440), it means the retrieved secret share 436-2 cannot be used to reconstitute the desired secret 434-2 (because it was not one of the secret shares 436-1 originally distributed to a shareholder 442).

Once the secret shares 436-2 are retrieved (and optionally verified), the secret 434-2 may be reconstituted in a secret reconstituting module 220. In some configurations, the secret reconstituting module 220 and the Shamir secret sharing module 210 may be implemented together. In examples, the secret reconstituting module 220 220 uses Shamir combining, which corresponds to Shamir splitting performed by the Shamir secret sharing module 210.

When the secret 434-2 cannot be reconstituted from the secret shares 436-2 (because an error occurring during secret 434-2 reconstitution or the reconstituted secret 434-2 does not match the original secret 434-1), the verification module 222 may identify at least one secret share 436-2 as being incorrect based on the metadata 440. In examples, this includes comparing a hash of at least one of the retrieved secret shares 436-2 to the list of share hashes 437 in the metadata 440. When a hash of a retrieved secret share 436-2 matches a hash in the list of share hashes 437 (in the metadata 440), it is a "correct" retrieved secret share 436-2 (because it matches the secret shares 436-1 that was originally distributed to a shareholder 442-1). When a hash of a retrieved secret share 436-2 does not match any hash in the list of share hashes 437 (in the metadata 440), it is identified as an "incorrect" retrieved secret share 436-2 (because it was not one of the secret shares 436-1 originally distributed to a shareholder 442). This post-reconstitution verification/identification can narrow a problem down to a particular shareholder's 442 secret share storage device or media 438.

Figure 5:
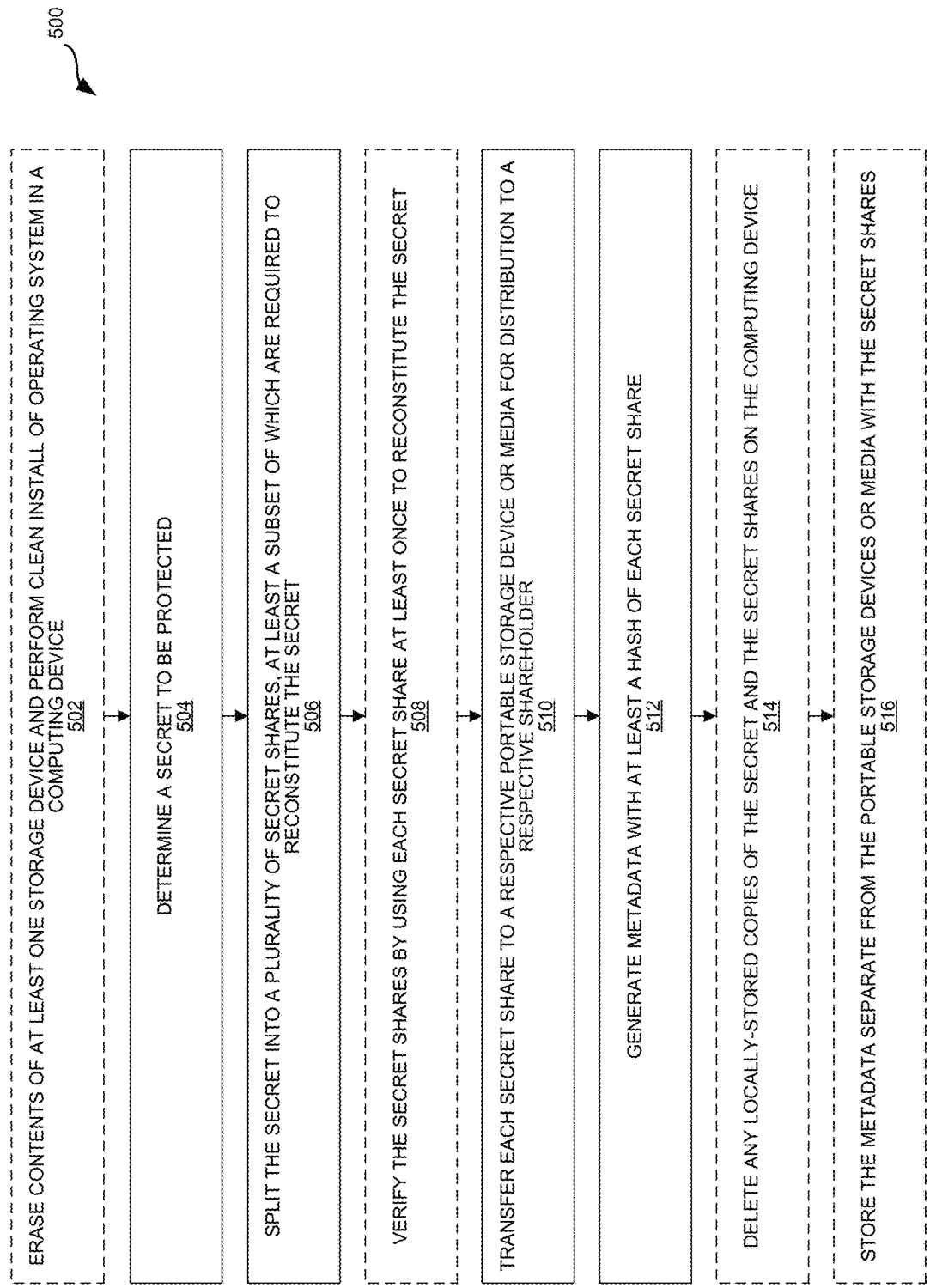
FIG. 5 is a flow diagram illustrating an exemplary method for splitting a secret and storing metadata.

FIG. 5 is a flow diagram illustrating an exemplary method 500 for splitting a secret 434-1 and storing metadata 440. The method 500 may be performed by a computing device 102 in a system 100 for secret splitting and metadata storage.

In examples, at least some of the steps in the method 500 are implemented by at least one processor in the computing device 102.

The method 500 begins at optional step 502 where the at least one processor erases the contents of at least one storage device (e.g., hard disc drive) in the computing device 102. In examples, this includes encrypting the contents of the at least one storage device and restoring an operating system (e.g., from a cloud-based server). A decryption key may be generated or derived, which can decrypt the contents of the storage device. Alternatively, any suitable technique for erasing the contents of a storage device may be used.

The method 500 proceeds at step 504 where the at least one processor determines a secret 434-1 to be protected. In examples, the secret 434-1 is any string of characters, e.g., a cryptographic private key 326 or a mnemonic phrase or seed 328 that can be used to reconstitute a private key 326. In examples where the secret 434-1 is a private key 326 or a mnemonic/seed 328, the determining may include the at least one processor generating the secret 434-1. Alternatively or additionally, the determining may include the at least one processor identifying and/or receiving an existing secret 434-1 rather than generating it.

When the secret 434-1 is a private key 326 or a mnemonic/seed 328 for recovering the private key 326, the at least one processor may also generate an optional public key 330 and/or at least one address 332 (that holds cryptocurrency) in a distributed ledger. When at least one optional address 332 is generated with the secret 434-1, it may optionally be verified by (1) sending a small amount of cryptocurrency to the address 332; and (2) verifying the small amount by viewing transactions for the address 332 in the distributed ledger itself. This serves to ensure that the address is a valid address on a desired distributed ledger.

The method 500 proceeds at step 506 where the at least one processor splits the secret 434-1 into a plurality of secret shares 436-1, at least a subset of which are required to reconstitute the secret 434-2. The secret 434-1 may be split using Shamir secret sharing and/or polynomial interpolation. In examples, a user of the computing device 102 is prompted to provide user input that specifies (1) how many secret shares 436-1 the secret 434-1 should be split into; and/or (2) how many secret shares 436-1 should be required to reconstitute the secret 434-1. In examples, the user may select any number for N (e.g., N=1-100) and M (e.g., M<=N). In examples, the user can tailor the configuration of M and N based on security of the secret 434-1, accessibility of the secret 434-1, and/or any other concerns.

The method 500 proceeds at optional step 508 where the at least one processor verifies the secret shares 436-1 by using each secret share 436-1 at least once to reconstitute the secret 434-1. For example, the secret 434-2 would need to be reconstituted at least N/M (rounded up to an integer) times, e.g., if M=3 and N=5, the secret 434-2 would need to be reconstituted 5/3 (rounded up to an integer)=2 times so that every secret share 436-1 is used at least once during secret reconstitution. The secret shares 436-1 can then be verified by: (1) comparing the secret 434-1 to the reconstituted secret(s) 434-2 (where the secret shares 436-1 are verified only when the secret 434-1 matches the reconstituted secret(s) 434-2); or (2) comparing a hash of the secret 434-1 to the hash(es) of the reconstituted secret(s) 434-2 (where the secret shares 436-1 are verified only when the hash of the secret 434-1 matches the hash(es) of the reconstituted secret(s) 434-2). In examples, the method 500 terminates or returns to any of the earlier steps when all of the secret shares 436-1 are not verified in optional step 508, e.g., when (1) the secret 434-1 does not match the reconstituted secret(s) 434-2; or (2) the hash of the secret 434-1 does not match the hash(es) of the reconstituted secret(s) 434-2.

The method 500 proceeds at step 510 where the at least one processor transfers each secret share 436-1 to a respective portable storage device or media for distribution to a respective shareholder 442. In examples, the secret shares 436-1 are transferred to archival-grade optical media, e.g., M-DISCs. However, other types of portable storage devices or media may be used instead of or in addition to optical media. Optionally, the secret shares 436-1 may be encrypted before being transferred to the portable storage devices or media.

The distribution may include physically placing each portable storage device or media into a security envelope or package that is tamper-resistant and/or tamper-evident, each security envelope having a unique identifier, then transferring a different security envelope or package to each shareholder 442.

The method 500 proceeds at step 512 where the at least one processor generates metadata 440 with at least a hash 437 of each secret share 436-1. Each share hash 437 may be a string of characters, the length of which is determined by the hashing function 212 used to generate the share hash 437, e.g., a share hash 437 generated using SHA-512 would be 512 bits long. Each secret share 436-1 may be deterministic of one hash value when a given modern hashing function 212 is used, such as SHA-512 (although hash collisions are possible in older hashing functions, such as some of the SHA-1 functions).

In addition to a list of the share hashes 437 (step 510), each copy of the metadata 440 may also include (1) a list of address(es) 332 that were generated with (and corresponding to) the secret 434-1; (2) a mapping of an identifier of each security envelope or package (used to distribute a secret share 436-1 to a particular secret 434-1/wallet number; (3) a copy of the hashing function 212 code used to generate the share hashes 437 in the metadata 440 (in optional step 508); and/or (4) a copy of the code used to split the secret 434-1 into secret shares 436-1 (in step 506).

The method 500 proceeds at optional step 514 where the at least one processor deletes locally-stored copies of the secret 434-1, the secret shares 436-1, and optionally the share hashes 437 (and any reconstituted secret(s) 434-2 generated in optional step 508). Optional step 518 may further include erasing the contents of the entire at least one storage device (e.g., hard disc drive) in the computing device 102 again (e.g., by securely deleting the decryption key created in optional 502).

The method 500 proceeds at optional step 516 where the at least one processor stores the metadata 440 separate from the portable storage devices or media with the secret shares 436-1. Each copy of the metadata 440 may be (1) stored on a portable storage device or media (e.g., an archival-grade optical media, such as an M-DISC); (2) stored in an electronic repository (e.g., restricting access to people having proper credentials); and/or (3) printed out as a QR code for safekeeping. Alternatively, any other suitable storage method may be used for the metadata 440. In examples, deleting the locally-stored copies of the secret 434-1 and secret shares 436-1 (in optional step 514) before writing the metadata 440 (in optional step 516) would prevent the secret 434-1 and secret shares 436-1 from being written to the metadata 440 medium.

In examples, the method 500 is performed without ever displaying the secret 434-1 or even the secret parts 436-1 to a user, even though share hashes 437 may be displayed. For additional security, in some configurations, the method 500 may be performed with at least one (e.g., two) witness, in addition to a user performing the process 500, to ensure the secret 434-1 and the secret shares 436-1 are not distributed without authorization.

Figure 6:
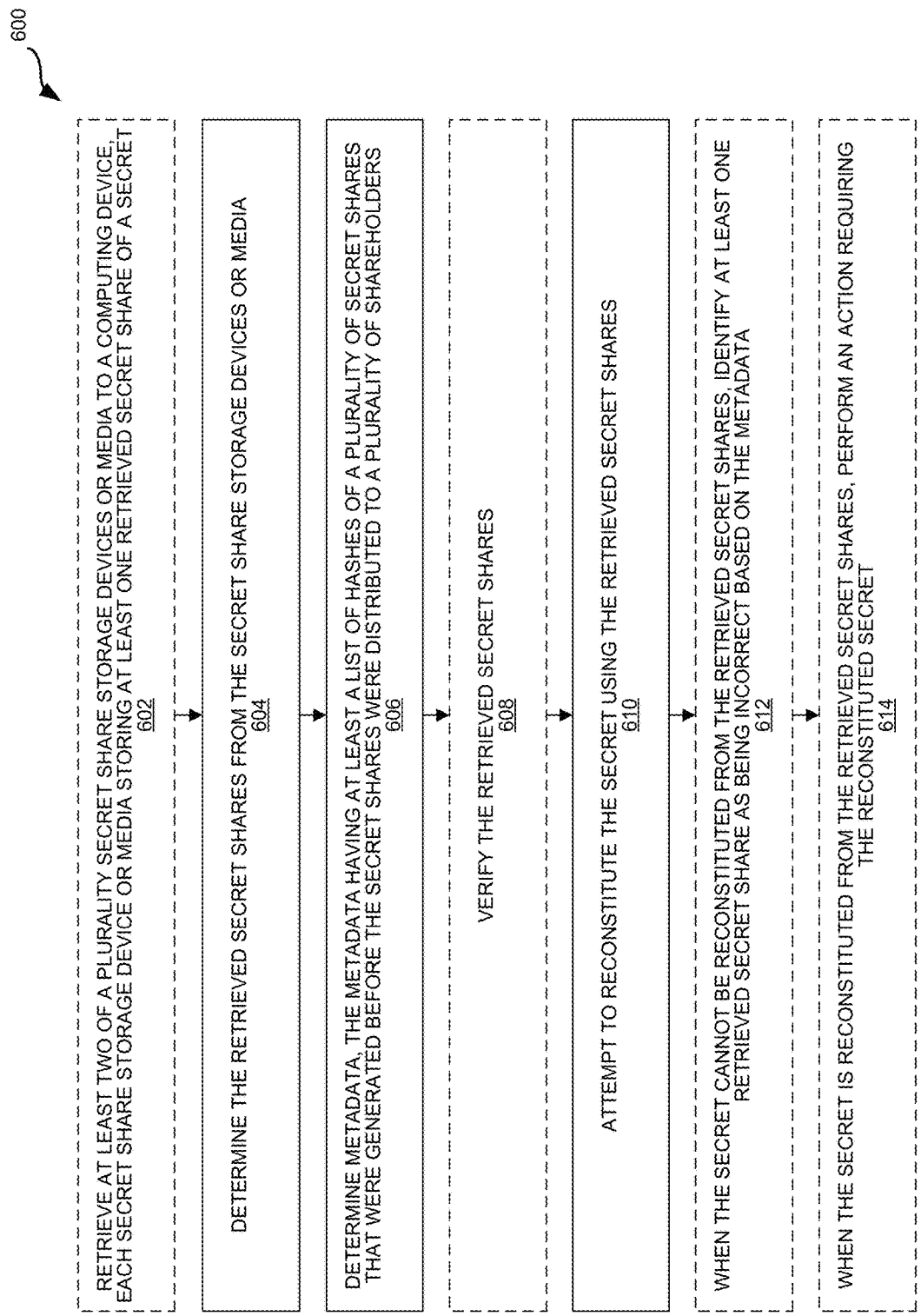
FIG. 6 is a flow diagram illustrating an exemplary method for reconstituting a secret from at least two of a plurality of secret shares.

FIG. 6 is a flow diagram illustrating an exemplary method 600 for reconstituting a secret 434-2 from at least two retrieved secret shares 436-2. The method 600 may be performed by a computing device 102. In examples, the method 600 in FIG. 6 is performed sequentially to the method 500 in FIG. 5, in which case the computing device 102 implementing the method 600 in FIG. 6 may or may not be the same as the computing device 102 implementing the method 500 in FIG. 5. In examples, at least some of the steps in the method 600 are implemented by at least one processor in a computing device 102.

The method 600 begins at optional step 602 where at least two of a plurality of secret share storage devices or media 438 are retrieved to a computing device 102, each secret share storage device or media 438 storing at least one retrieved secret share 436-2 of a secret 434-1. The number of secret share storage devices or media 438 retrieved depends on the values of M and N that were determined during secret 434-1 splitting. When M<N, the number of retrieved secret share storage devices or media 438 is less than the number of distributed secret shares 436-1. When M=N, all of the distributed secret share storage devices or media 438 are retrieved for secret 434-2 reconstitution. In examples, at least a subset of the secret share storage devices or media 438 are physically brought to the computing device 102. In examples, at least a subset of the shareholders 442 may be asked to bring their respective secret share storage device or media 438 to a meeting at an appointed date and time.

The method 600 proceeds at step 604 where secret shares 436-1 are determined from the secret share storage devices or media 438, e.g., the retrieved secret shares 436-2 are read from the secret share storage devices or media 438 and optionally stored on the computing device 102. If storage devices (e.g., USB drives) are used, they may be connected to the computing device, e.g., via USB port. If optical media (e.g., M-DISCs) are used, they may be placed into a disc drive in order to read the retrieved secret shares 436-2 and optionally store them on the computing device 102.

When the secret shares 436-1 were encrypted before distribution, step 604 can include decrypting the secret shares 436-1. When a secret share 436-1 is symmetrically encrypted before distribution (using a symmetric key), it is symmetrically decrypted following retrieval (using the same symmetric key). When a secret share 436-1 is asymmetrically encrypted before distribution (using a public key), it is asymmetrically decrypted following retrieval (using a private key corresponding to the public key). When secret shares 436-1 are not encrypted before distribution to the shareholders 442, they would not need to be decrypted in step 604.

The method 600 proceeds at step 606 where the at least one processor determines metadata 440 (for the secret 434-1), the metadata 440 having at least a list of the hashes 437 of the secret shares 436-1 that were generated before the secret shares 436-1 were distributed to shareholders 442. In examples, the metadata 440 also includes: (1) a list of address(es) 332 that were generated with (and corresponding to) the secret 434-1; (2) a mapping of an identifier of each security envelope or package (used to distribute a secret share 436-1 to a particular secret 434-1/wallet number; (3) a copy of the hashing function 212 code used to generate the share hashes 437 in the metadata 440; and/or (4) a copy of the code used to split the secret 434-1 into secret shares 436-1 before distribution.

The method 600 proceeds at optional step 608 where the at least one processor verifies the retrieved secret shares 436-2. In examples, a hash of at least one of the retrieved secret shares 436-2 is compared against the list of share hashes 437 in the metadata 440. When a hash of a retrieved secret share 436-2 matches a hash in the list of share hashes 437 (in the metadata 440), it means the retrieved secret share 436-2 can be used to reconstitute the desired secret 434-2 (because it matches the secret shares 436-1 that was originally distributed to a shareholder 442-1). When a hash of a retrieved secret share 436-2 does not match any hash in the list of share hashes 437 (in the metadata 440), it means the retrieved secret share 436-2 cannot be used to reconstitute the desired secret 434-2 (because it was not one of the secret shares 436-1 originally distributed to a shareholder 442). In examples, subsequent steps of the method 600 are only performed when all the retrieved secret shares 436-2 are verified in optional step 608.

The method 600 proceeds at step 610 where the at least one processor attempts to reconstitute the secret 434-2 using the retrieved secret shares 436-2. In examples, step 610 uses Shamir combining, which corresponds used to the Shamir secret sharing (splitting of the secret 434-1) performed before distribution of the secret shares 436-1.

The method 600 proceeds at optional step 612 where, when the secret 434-2 cannot be reconstituted from the retrieved secret shares 436-2, the at least one processor identifies at least one secret share 436-2 as being incorrect based on the metadata 440. For example, optional step 612 may be performed (1) in response to an error occurring during secret 434-2 reconstitution; or (2) when a secret 434-2 is reconstituted in step 610 that does not match the original secret 434-1 that was split and distributed. This scenario (where a reconstituted secret 434-2 does not match the original secret 434-1) can be determined by (1) comparing a hashes of the secret and reconstituted secret 434-1; (2) determining whether an account balance of an address associated with the reconstituted secret 434-2 is correct (although an address might not have a balance and/or show up in blockchain explorer if that address hasn't received any transactions); or (3) comparing an address (in the metadata 440) to an address derived from the reconstituted secret 434-2.

Optional step 612 may be performed similar to optional step 608, e.g., a hash of at least one of the retrieved secret shares 436-2 is compared against the list of share hashes 437 in the metadata 440. When a hash of a retrieved secret share 436-2 matches a hash in the list of share hashes 437 (in the metadata 440), it is a "correct" retrieved secret share 436-2 (because it matches the secret shares 436-1 that was originally distributed to a shareholder 442-1). When a hash of a retrieved secret share 436-2 does not match any hash in the list of share hashes 437 (in the metadata 440), it is identified as an "incorrect" retrieved secret share 436-2 (because it was not one of the secret shares 436-1 originally distributed to a shareholder 442).

Thus, in the event that one of the shareholders 442 brought in the wrong secret share storage device or media 438 (intentionally or unintentionally), the method 600 can help narrow the problem to a particular shareholder's 442 secret share storage device or media 438 (holding an incorrect retrieved secret share 436-2). By narrowing the cause of the problem to a particular shareholder 442, the problem can be better addressed.

In examples where the secret share storage devices or media 438 are distributed in tamper-resistant and/or tamper-evident security envelopes or packages, the security envelopes or packages may list a secret 434-1 identifier (e.g., "Wallet 1") so that a shareholder 442 could easily identify which of multiple security envelopes or packages in their possession they should bring for reconstitution of a particular secret 434-1.

Additionally, by having the metadata 440 separate from the secret share storage devices or media 438, an unauthorized possessor of the metadata 440 or a secret share storage device or media 438 would likely not have enough information to steal remaining secret share storage devices or media 438 to reconstitute the secret 434-2. In fact, an unauthorized possessor of one of the secret share storage devices or media 438 likely wouldn't know what type of data was represented by the secret share 436-1 or if/how it might be valuable. However, the metadata 440 may still be useful, even without the secret share storage devices or media 438, e.g., it can allow someone to monitor transactions associated with the address(es) listed in the metadata 440 and/or send cryptocurrency to the address(es) in the metadata 440.

Furthermore, the mapping of which individual is a shareholder 442 may not be readily available from the metadata 440 or the secret share storage devices or media 438. Such mapping itself may jeopardize the safety of the shareholders 442. By not including this mapping in the metadata 440, it is more difficult to figure out which individual is a shareholder 442. However, a separate mapping (of individual to security envelope or package number) may exist, which is accessible by a very small number of people in some configurations.

The method 600 proceeds at optional step 614 where, when the secret 434-2 is reconstituted from the retrieved secret shares 436-2, the at least one processor performs an action requiring the reconstituted secret 434-2. Examples of this action may include: (1) encrypting or decrypting data using the reconstituted secret 434-2; (2) generating a transaction address in a distributed ledger based on the reconstituted secret 434-2; and/or (3) signing a transaction, which sends cryptocurrency out of the address, using the reconstituted secret 434-2.

In examples, the method 600 is performed without ever displaying the reconstituted secret 434-1 or even the reconstituted secret parts 436-1 to a user. For additional security, in some configurations, the method 600 may be performed with at least one (e.g., two) witness, in addition to a user performing the process 600, to ensure the secret 434-1 and the secret shares 436-1 are not distributed without authorization.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 7:
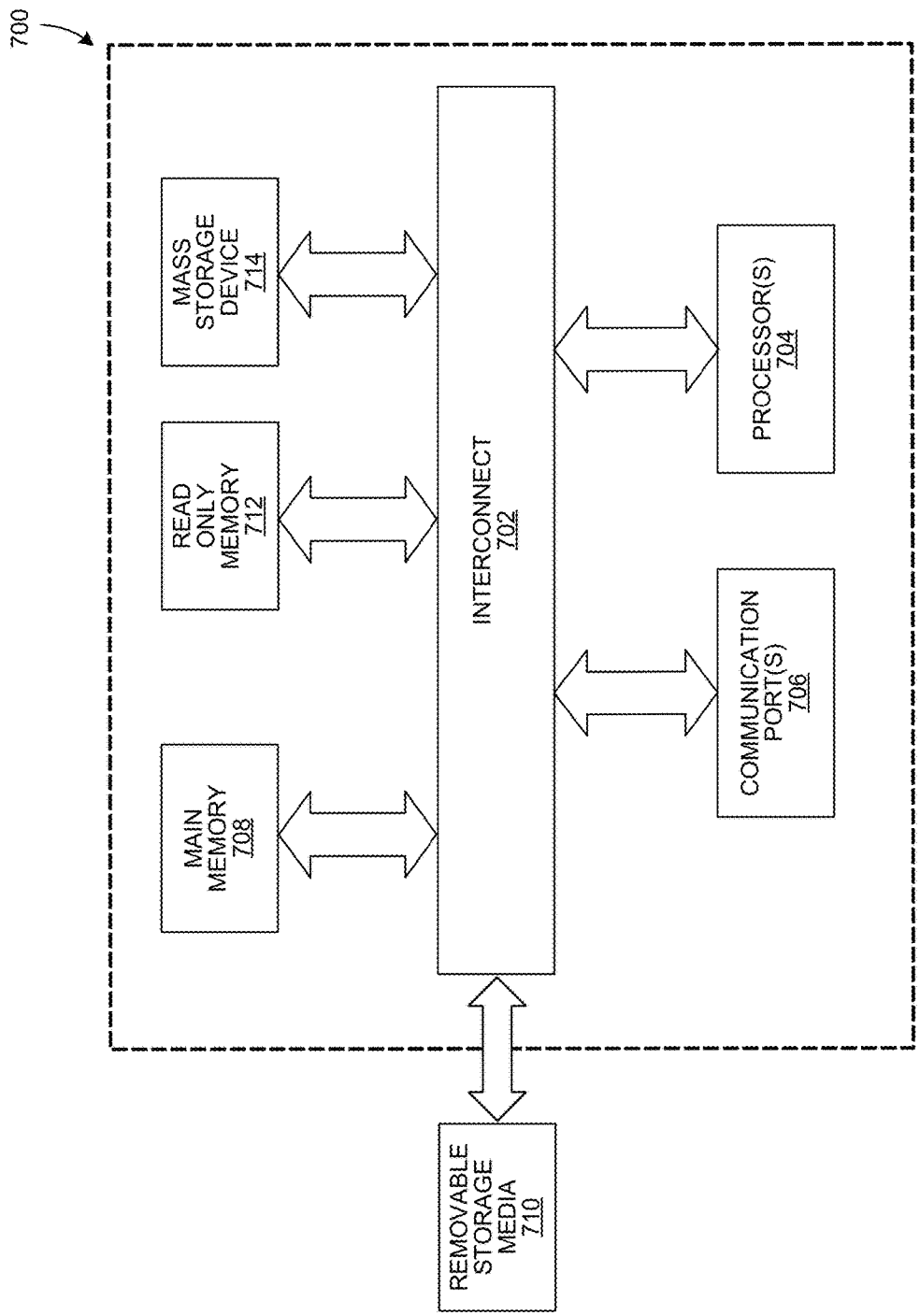
FIG. 7 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. According to the present example, the computer system 700 includes an interconnect 702, at least one processor 704, at least one communication port 706, at least one main memory 708, at least one removable storage media 710, at least one read only memory 712, and at least one mass storage device 714.

The at least one processor 704 can be any known processor. The at least one communication port 706 can be or include, for example, any of an RS-232 port for use with a modem-based dialup connection, a 10/100 Ethernet port, or a Gigabit port using copper or fiber. The nature of the at least one communication port 706 may be chosen depending on a network such a Local Area Network (LAN), Wide Area Network (WAN), or any network to which the computer system 700 connects. The at least one main memory 708 can be Random Access Memory (RAM), or any other dynamic storage device(s) commonly known in the art. The at least one read only memory 712 can be any static storage device(s) such as Programmable Read Only Memory (PROM) chips for storing static information such as instructions for the at least one processor 704.

The at least one mass storage device 714 can be used to store information and instructions. For example, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 702 can be or include one or more buses, bridges, controllers, adapters, and/or point-to-point connections. Interconnect 702 communicatively couples the at least one processor 704 with the other memory, storage, and communication blocks. Interconnect 702 can be a PCI/PCI-X or SCSI based system bus depending on the storage devices used. The at least one removable storage media 710 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE), MILLENNIAL DISC (M-DISC), etc.

The components described above are meant to exemplify some types of possibilities. In no way should the aforementioned examples limit the disclosure, as they are only exemplary embodiments. The embodiments, structure, methods, etc. described herein, including those below and above, can be combined together in various ways.

Terminology

Brief definitions of terms, abbreviations, and phrases used throughout this application are given below.

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for secret splitting and metadata storage. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Examples

Example 1 includes a computing device comprising: at least one processor; at least one memory communicatively coupled to the at least one processor; and wherein the at least one processor is configured to: determine a secret to be protected; split the secret into a plurality of secret shares, at least a subset of which are required to reconstitute the secret; transfer each secret share to a respective portable storage device or media for distribution to a respective shareholder; generate metadata with at least a hash of each secret share; and store the metadata separate from the portable storage devices or media with the secret shares.

Example 2 includes the computing device of Example 1, wherein each of the secret, the secret shares, and the hashes of the secret shares are a different string of characters.

Example 3 includes the computing device of any of Examples 1-2, wherein the secret is a cryptographic private key or a mnemonic phrase or seed that can be used to reconstitute a private key.

Example 4 includes the computing device of any of Examples 1-3, wherein the at least one processor is configured to split the secret into the plurality of secret shares using Shamir secret sharing or polynomial interpolation.

Example 5 includes the computing device of any of Examples 1-4, wherein the at least one processor is configured to verify the secret shares by using each secret share at least once to reconstitute the secret, and wherein the secret shares are only transferred to their respective portable storage devices or media after the secret shares are successfully verified.

Example 6 includes the computing device of any of Examples 1-5, wherein the at least one processor is configured to: before determining the secret, erase contents of at least one storage device and perform a clean installation of an operating system in the computing device; and after transferring each secret share to a respective portable storage devices or media, delete any locally-stored copies of the secret and the secret shares on the computing device.

Example 7 includes the computing device of any of Examples 1-6, wherein the secret is a cryptographic private key or a mnemonic phrase or seed that can be used to recover the cryptographic private key, wherein the at least one processor is configured to determine the secret by generating the cryptographic private key or mnemonic phrase or seed.

Example 8 includes the computing device of Example 7, wherein the at least one processor also generates the following information in the metadata: a public key that corresponds to the cryptographic private key; and at least one address in a distributed ledger.

Example 9 includes the computing device of any of Examples 1-8, wherein the at least one processor is configured to: determine retrieved secret shares from at least two secret share storage devices or media that are retrieved from the shareholders; and attempt to reconstitute the secret using the retrieved secret shares from the at least two secret share storage devices or media.

Example 10 includes the computing device of Example 9, wherein the at least one processor is configured to: when the secret cannot be reconstituted from the retrieved secret shares, identify at least one of the retrieved secret shares as being incorrect based on the metadata.

Example 11 includes a method for secret splitting and metadata storage, comprising: determining a secret to be protected; splitting the secret into a plurality of secret shares, at least a subset of which are required to reconstitute the secret; transferring each secret share to a respective portable storage device or media for distribution to a respective shareholder; generating metadata with at least a hash of each secret share; and storing the metadata separate from the portable storage devices or media with the secret shares.

Example 12 includes the method of Example 11, wherein each of the secret, the secret shares, and the hashes of the secret shares are a different string of characters.

Example 13 includes the method of any of Examples 11-12, wherein the secret is a cryptographic private key or a mnemonic phrase or seed that can be used to reconstitute a private key.

Example 14 includes the method of any of Examples 11-13, wherein the splitting comprises splitting the secret into the plurality of secret shares using Shamir secret sharing or polynomial interpolation.

Example 15 includes the method of any of Examples 11-14, further comprising verifying the secret shares by using each secret share at least once to reconstitute the secret, and wherein the secret shares are only transferred to their respective portable storage devices or media after the secret shares are successfully verified.

Example 16 includes the method of any of Examples 11-15, further comprising: before determining the secret, erase contents of at least one storage device and perform a clean installation of an operating system in a computing device; and after transferring each secret share to a respective portable storage devices or media, delete any locally-stored copies of the secret and the secret shares on the computing device.

Example 17 includes the method of any of Examples 11-16, wherein the secret is a cryptographic private key or a mnemonic phrase or seed that can be used to recover the cryptographic private key, wherein the secret is determined by generating the cryptographic private key or mnemonic phrase or seed.

Example 18 includes the method of Example 17, further comprising generating the following information in the metadata: a public key that corresponds to the cryptographic private key; and at least one address in a distributed ledger.

Example 19 includes the method of any of Examples 11-18, further comprising: determining a retrieved secret share from each of at least two secret share storage devices or media that are retrieved from the shareholders; and attempting to reconstitute the secret using the retrieved secret shares from the at least two secret share storage devices or media.

Example 20 includes the method of Example 19, further comprising, when the secret cannot be reconstituted from the retrieved secret shares, identify at least one of the retrieved secret shares as being incorrect based on the metadata.

Example 21 includes a computing device comprising: at least one processor; at least one memory communicatively coupled to the at least one processor; and wherein the at least one processor is configured to: determine a retrieved secret share from each of at least two secret share storage devices or media that are retrieved from at least two of a plurality of shareholders; determine metadata, the metadata having at least a list of hashes of a plurality of secret shares that were generated before the secret shares were distributed to the plurality of shareholders; attempt to reconstitute the secret using the retrieved secret shares from the at least two secret share storage devices or media; and when the secret cannot be reconstituted from the retrieved secret shares, identify at least one of the retrieved secret shares as being incorrect based on the metadata.

Example 22 includes the computing device of Example 21, wherein each of the secret, the retrieved secret shares, and the hashes of the plurality of secret shares are a different string of characters.

Example 23 includes the computing device of any of Examples 21-22, wherein the secret is a cryptographic private key or a mnemonic phrase or seed that can be used to reconstitute a private key.

Example 24 includes the computing device of any of Examples 21-23, wherein the at least one processor is configured to attempt to reconstitute the secret using Shamir combining.

Example 25 includes the computing device of any of Examples 21-24, wherein the at least one processor is configured to verify each of the retrieved secret shares by comparing the respective retrieved secret share to the list of hashes in the metadata, and wherein, when a respective retrieved secret share matches a hash in the list of hashes in the metadata, the respective retrieved secret share is successfully verified.

Example 26 includes the computing device of Example 25, wherein the at least one processor is configured to attempt to reconstitute the secret only after the secret shares are successfully verified.

Example 27 includes the computing device of any of Examples 21-26, wherein the at least one processor is configured to, when the secret is reconstituted from the retrieved secret shares, perform at least one of the following actions requiring the reconstituted secret: encrypting or decrypting data using the reconstituted secret; generating a transaction address in a distributed ledger based on the reconstituted secret; or signing a transaction using the reconstituted secret, wherein the transaction sends cryptocurrency out of an address in the distributed ledger.

Example 28 includes the computing device of any of Examples 21-27, wherein the at least one processor is configured to, before the retrieved secret shares are determined: split the secret into the plurality of secret shares, at least a subset of which are required to reconstitute the secret; and transfer each secret share to a respective portable storage device or media; wherein each portable storage device or media is distributed to the plurality of shareholders.

Example 29 includes a method, comprising: determining a retrieved secret share from each of at least two secret share storage devices or media that are retrieved from at least two of a plurality of shareholders; determining metadata, the metadata having at least a list of hashes of a plurality of secret shares that were generated before the secret shares were distributed to the plurality of shareholders; attempting to reconstitute the secret using the retrieved secret shares from the at least two secret share storage devices or media; and when the secret cannot be reconstituted from the retrieved secret shares, identifying at least one of the retrieved secret shares as being incorrect based on the metadata.

Example 30 includes the method of Example 29, wherein each of the secret, the retrieved secret shares, and the hashes of the plurality of secret shares are a different string of characters.

Example 31 includes the method of any of Examples 29-30, wherein the secret is a cryptographic private key or a mnemonic phrase or seed that can be used to reconstitute a private key.

Example 32 includes the method of any of Examples 29-31, further comprising attempting to reconstitute the secret using Shamir combining.

Example 33 includes the method of any of Examples 29-32, further comprising verifying each of the retrieved secret shares by comparing the respective retrieved secret share to the list of hashes in the metadata, wherein, when a respective retrieved secret share matches a hash in the list of hashes in the metadata, the respective retrieved secret share is successfully verified.

Example 34 includes the method of Example 33, wherein the attempting comprises attempting to reconstitute the secret only after the secret shares are successfully verified.

Example 35 includes the method of any of Examples 29-34, further comprising, when the secret is reconstituted from the retrieved secret shares, performing at least one of the following actions requiring the reconstituted secret: encrypting or decrypting data using the reconstituted secret; generating a transaction address in a distributed ledger based on the reconstituted secret; or signing a transaction using the reconstituted secret, wherein the transaction sends cryptocurrency out of an address in the distributed ledger.

Example 36 includes the method of any of Examples 29-35, further comprising, before the retrieved secret shares are determined: splitting the secret into the plurality of secret shares, at least a subset of which are required to reconstitute the secret; and transferring each secret share to a respective portable storage device or media: wherein each portable storage device or media is distributed to the plurality of shareholders.

What is claimed is:

1. A computing system comprising:
   at least one processor configured to:
   split a secret into a plurality of secret shares, at least a subset of which are required to reconstitute the secret;
   transfer each respective secret share of the plurality of secret shares to a respective portable storage device or media;
   wherein each portable storage device or media is distributed to a plurality of shareholders;
   determine a retrieved secret share from each of at least two secret share storage devices or media that are retrieved from at least two of the plurality of shareholders;
   determine metadata, the metadata having at least a list of hashes of the plurality of secret shares that were generated before the plurality of secret shares were distributed to the plurality of shareholders;
   compare a respective hash of each respective retrieved secret share to each hash in the list of hashes of the plurality of secret shares within the metadata;
   determine whether each respective retrieved secret share is one of the plurality of secret shares that were generated based on whether the respective hash of the respective retrieved secret share matches any hash in the list of hashes of the plurality of secret shares within the metadata; and
   in response to determining that each retrieved secret share is among the plurality of secret shares that were generated, attempt to reconstitute the secret using retrieved secret shares from the at least two secret share storage devices or media, wherein each of the secret, the retrieved secret share from each of the at least two secret share storage devices or media, and the hashes of the plurality of secret shares are a different string of characters.

2. The computing system of claim 1, wherein the secret is a cryptographic private key or a mnemonic phrase or seed that is used to reconstitute a private key.

3. The computing system of claim 1, wherein the at least one processor is configured to attempt to reconstitute the secret using Shamir combining.

4. The computing system of claim 1, wherein the at least one processor is configured to, when the secret is reconstituted as a reconstituted secret from the retrieved secret shares, perform at least one of the following actions requiring the reconstituted secret:
   encrypting or decrypting data using the reconstituted secret;
   generating a transaction address in a distributed ledger based on the reconstituted secret; or
   signing a transaction using the reconstituted secret, wherein the transaction sends cryptocurrency out of an address in the distributed ledger.

5. The computing system of claim 1, wherein the at least one processor is further configured to identify, when the attempt to reconstitute the secret is not successful, at least one of the retrieved secret shares as not being one of the plurality of secret shares that were generated when the respective hash of the respective retrieved secret share does not match any hash in the list of hashes of the plurality of secret shares within the metadata.

6. The computing system of claim 1, wherein the at least one processor is further configured to perform, when the secret is reconstituted from the retrieved secret shares, an action requiring a reconstituted secret.

7. The computing system of claim 1, wherein the at least one processor is further configured to decrypt at least one of the retrieved secret shares.

8. The computing system of claim 1, wherein the metadata further has a copy of executable instructions used to split the secret into secret shares before distribution.

9. The computing system of claim 1, wherein the metadata further has a copy of executable instructions used to generate the list of hashes of the plurality of secret shares.

10. A method, comprising:
- splitting a secret into a plurality of secret shares, at least a subset of which are required to reconstitute the secret;
- transferring each respective secret share of the plurality of secret shares to a respective portable storage device or media;
- wherein each portable storage device or media is distributed to a plurality of shareholders;
- determining a retrieved secret share from each of at least two secret share storage devices or media that are retrieved from at least two of the plurality of shareholders;
- determining metadata, the metadata having at least a list of hashes of the plurality of secret shares that were generated before the plurality of secret shares were distributed to the plurality of shareholders;
- comparing a respective hash of each respective retrieved secret share to each hash in the list of hashes of the plurality of secret shares within the metadata;
- determining whether each respective retrieved secret share is one of the plurality of secret shares that were generated based on whether the respective hash of the respective retrieved secret share matches any hash in the list of hashes of the plurality of secret shares within the metadata; and
- in response to determining that each retrieved secret share is among the plurality of secret shares that were generated, attempting to reconstitute the secret using retrieved secret shares from the at least two secret share storage devices or media, wherein each of the secret, the retrieved secret share from each of the at least two secret share storage devices or media, and the hashes of the plurality of secret shares are a different string of characters.

11. The method of claim 10, wherein the secret is a cryptographic private key or a mnemonic phrase or seed that is used to reconstitute a private key.

12. The method of claim 10, further comprising attempting to reconstitute the secret using Shamir combining.

13. The method of claim 10, further comprising, when the secret is reconstituted as a reconstituted secret from the retrieved secret shares, performing at least one of the following actions requiring the reconstituted secret:
- encrypting or decrypting data using the reconstituted secret;
- generating a transaction address in a distributed ledger based on the reconstituted secret; or
- signing a transaction using the reconstituted secret, wherein the transaction sends cryptocurrency out of an address in the distributed ledger.

14. The method of claim 10, further comprising identifying, when the attempt to reconstitute the secret is not successful, at least one of the retrieved secret shares as not being one of the plurality of secret shares that were generated when the respective hash of the respective retrieved secret share does not match any hash in the list of hashes of the plurality of secret shares within the metadata.

15. The method of claim 10, further comprising performing, when the secret is reconstituted from the retrieved secret shares, an action requiring a reconstituted secret.

16. The method of claim 10, further comprising at least one of the retrieved secret shares.

17. The method of claim 10, wherein the metadata further has a copy of executable instructions used to split the secret into secret shares before distribution.

18. The method of claim 10, wherein the metadata further has a copy of executable instructions used to generate the list of hashes of the plurality of secret shares.

* * * * *